United States Patent Office 3,396,826
Patented Aug. 13, 1968

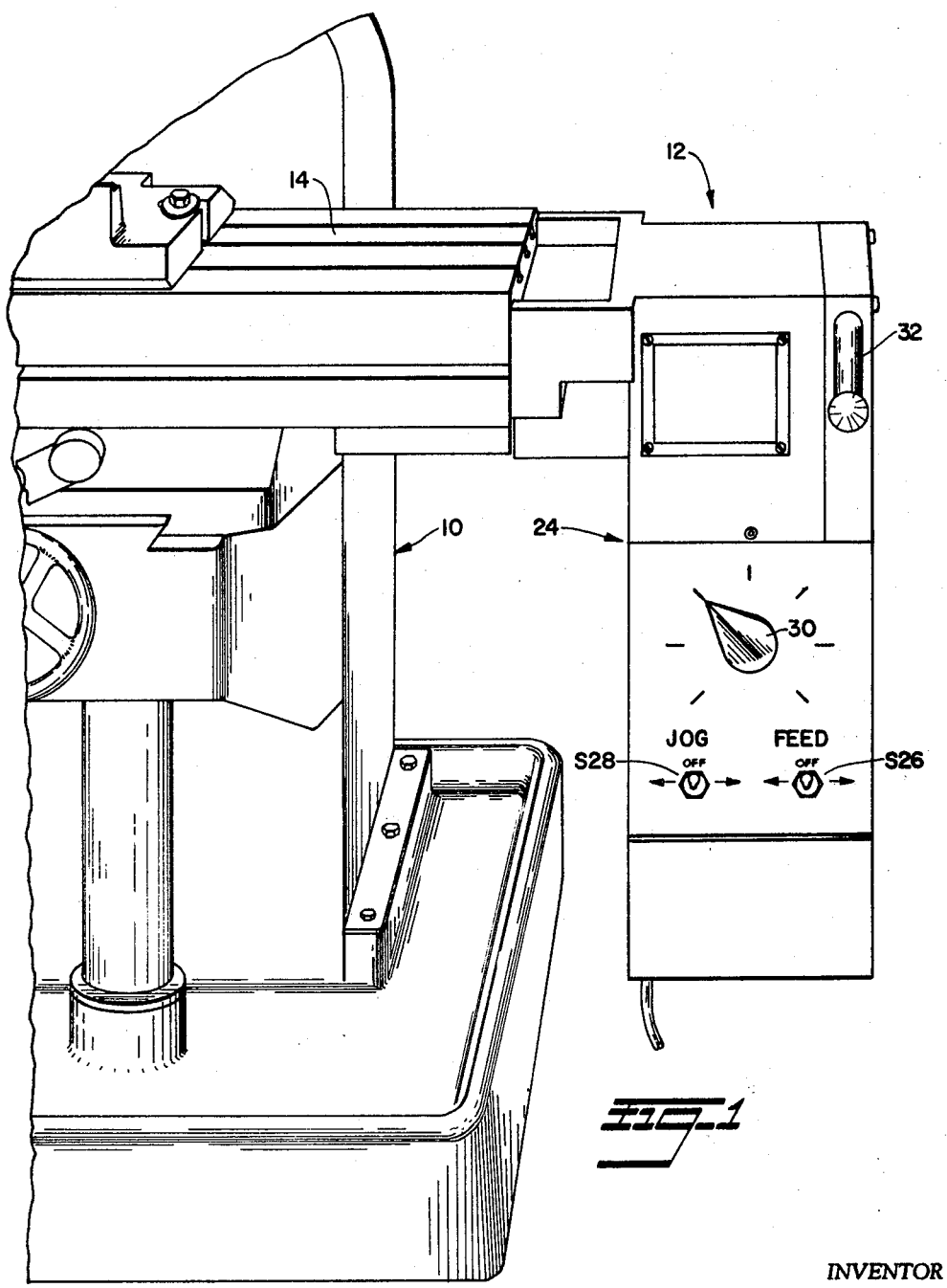

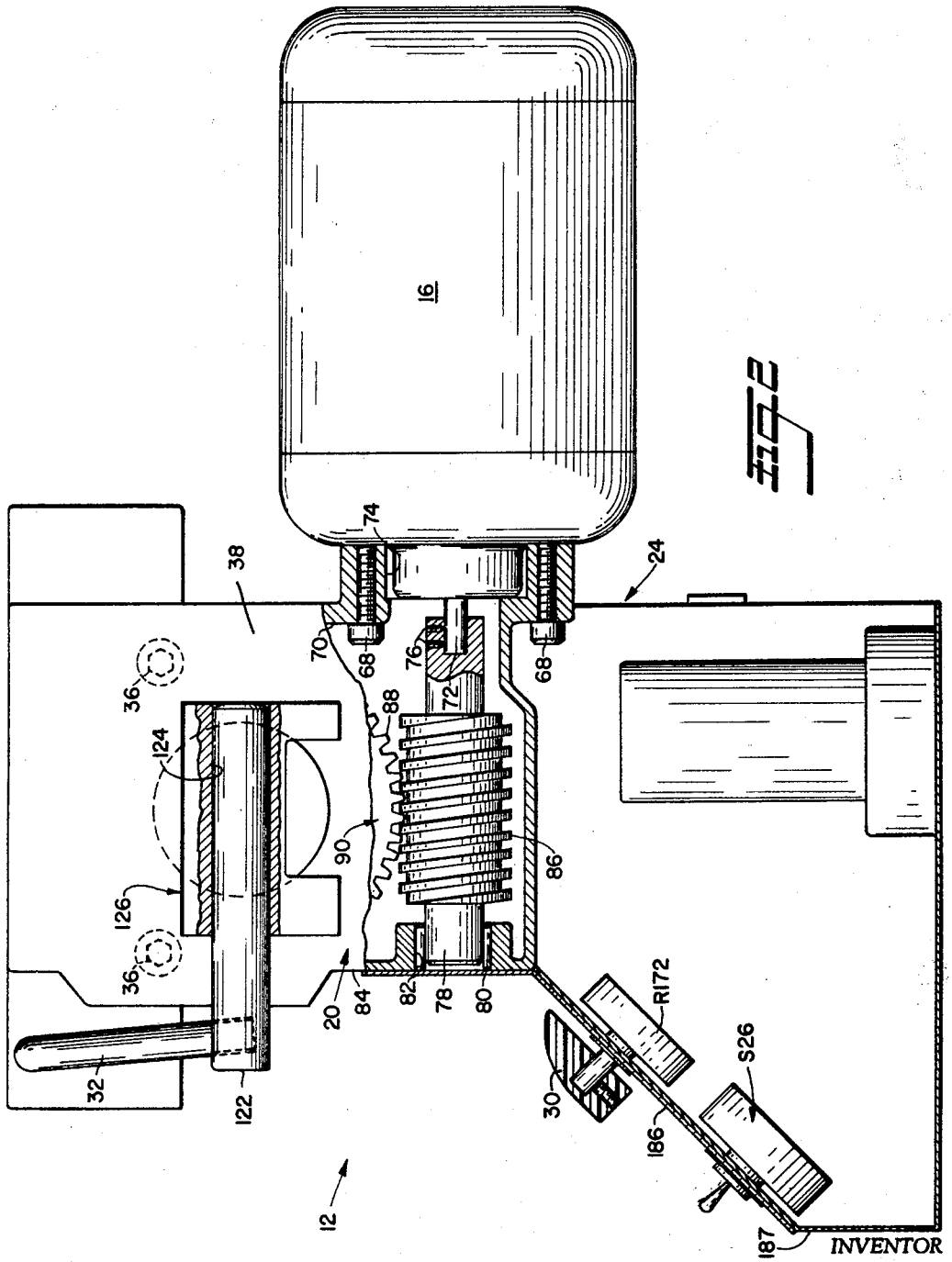

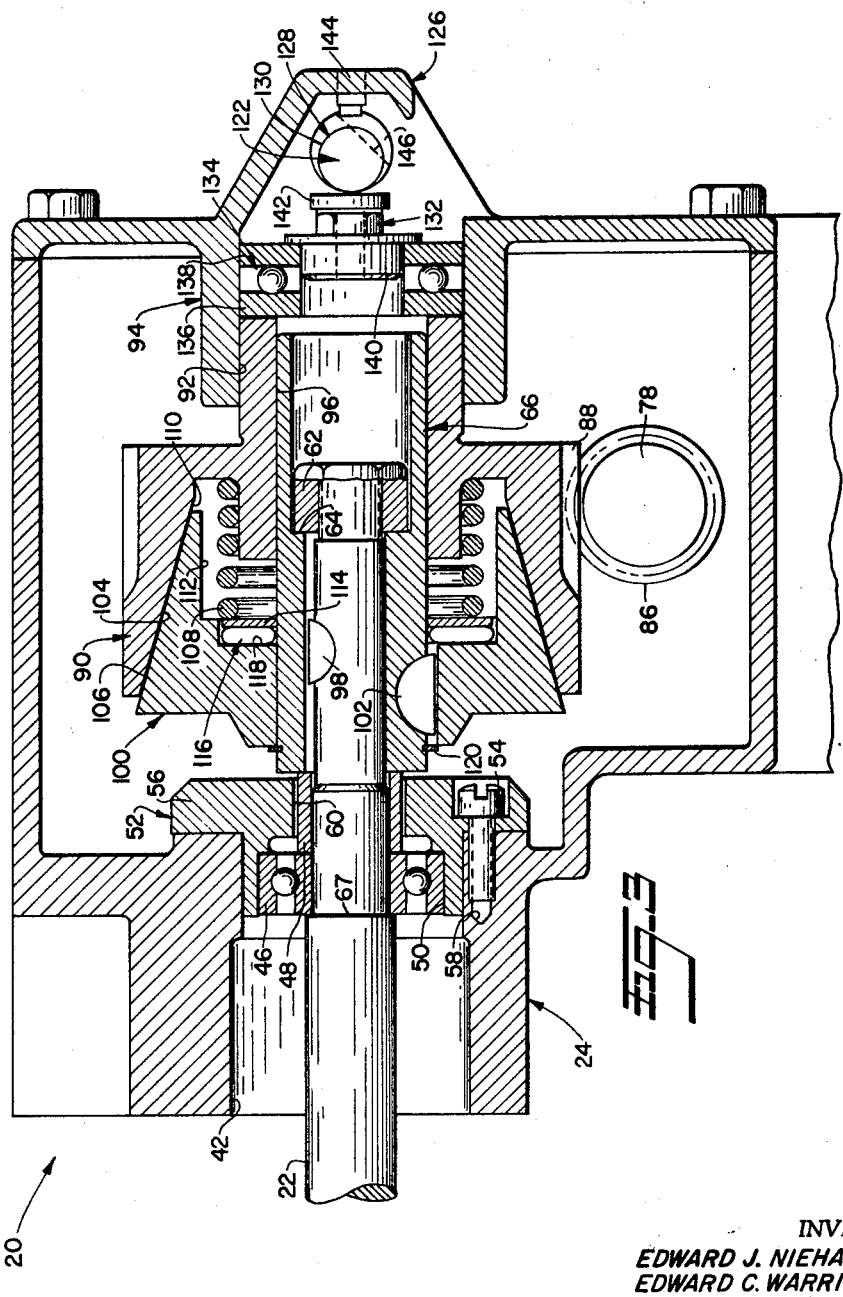

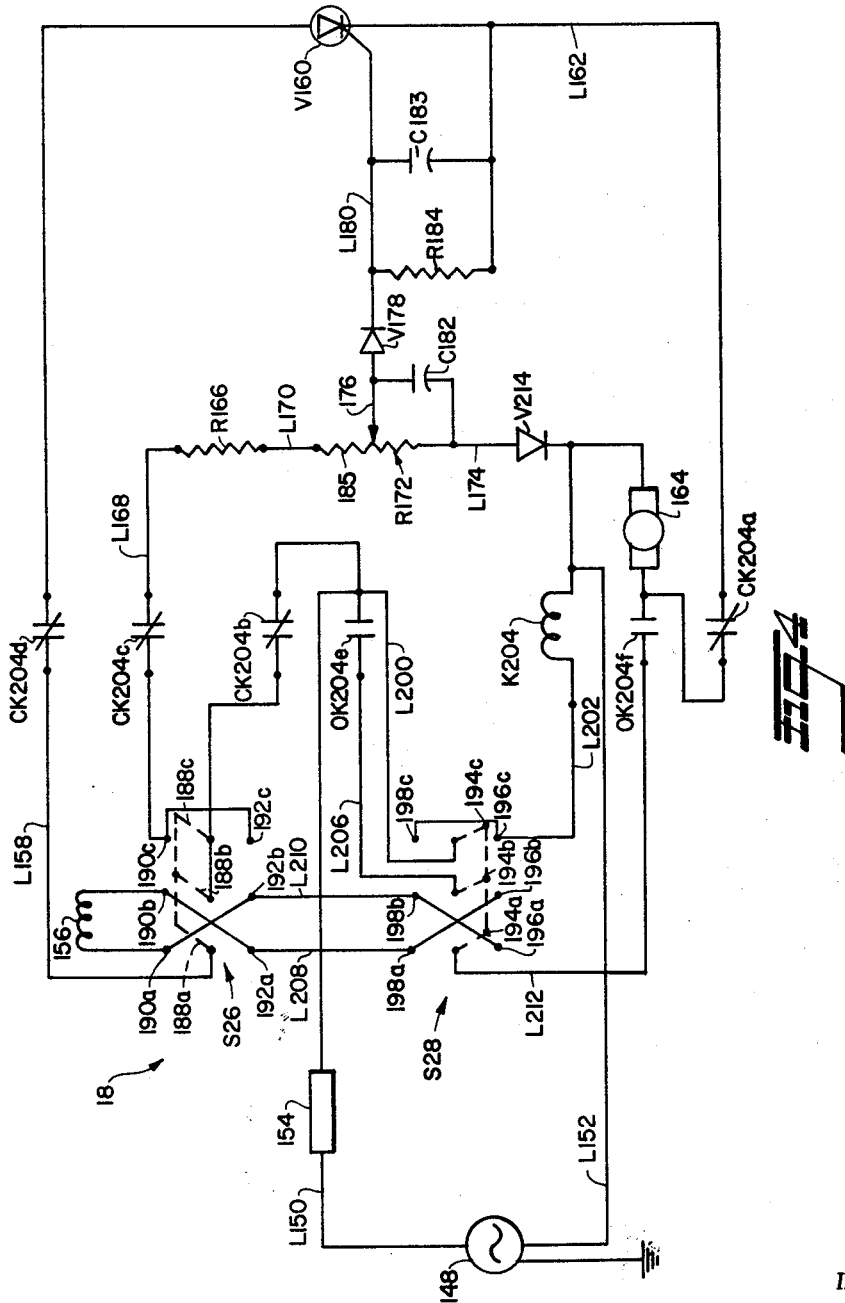

3,396,826
ELECTRIC MOTOR CONTROL AND CLUTCH
Edward C. Warrick and Edward J. Niehaus, Jr., Pittsburgh, Pa., assignors to Rockwell Manufacturing Company, Pittsburgh, Pa., a corporation of Pennsylvania
Filed Oct. 8, 1965, Ser. No. 494,168
13 Claims. (Cl. 192—.02)

ABSTRACT OF THE DISCLOSURE

Power drive units for machine tools and the like including an electric motor, a speed control system capable of maintaining the motor speed at a selectively adjustable level despite changes in the load on the motor and including arrangements for reversing the direction of motor rotation and for bypassing the speed regulating circuitry to operate the motor at a higher speed, and an arrangement including a selectively engageable clutch which can be adjusted to slip at selectively variable torques for drive-connecting the motor to the device with which it is associated.

---

This invention relates to power drive units and, more particularly, to self-contained, selectively engageable, variable speed power drive units for machine tools and the like.

The power drive units provided by the present invention may advantageously be employed to operate the table feeds of milling machines, and the principles of the present invention will therefore be developed by relating them to this particular application of the invention. However, as the present invention has other applications, the ensuing discussion is intended to be illustrative and not definitive of the scope of the invention, which is limited only by the appended claims.

Most, if not all, of the smaller milling machines currently on the market have table feeds which must be operated manually despite the recognized advantages of power feeds. This is because the power feeds heretofore available have been too complex and, therefore, too expensive to manufacture and maintain to make them economically feasible for other than high capacity machines.

Accordingly, it is a primary object of the present invention to provide novel power drive units for milling machine table feeds and other applications which are comparatively simple and inexpensive to manufacture and maintain.

Another important and related object of this invention is the provision of novel improved power drive units which can be readily added as accessories to machines having manual feeds.

Generally speaking, the novel power drives by which these and other objects of the present invention are accomplished are a unitized attachment including an electric motor, an electric control for maintaining the motor at an adjustable operating speed, and a transmission for connecting the motor to, for example, the lead screw of a milling machine table feed. The transmission includes a clutch which permits the lead screw to be engaged and disengaged and also prevents the motor from stalling and overheating when the table reaches the limits of its travel. This is an important feature of the present invention as it completely eliminates the limit switches and associated circuitry heretofore commonly employed for this purpose.

The speed control system just mentioned is also an important feature of the present invention. Basically, this system employs electronic speed regulating circuitry similar to that disclosed in the General Electric SCR Manual (3rd edition). In addition, however, the novel motor control system of the present invention includes circuitry which permits the motor to be selectively operated at speeds above those for which the speed regulating circuitry is set, providing a rapid traverse for a milling machine table, for example. Also the control circuitry disclosed herein permits the direction of rotation of the drive unit motor to be reversed both at normal operating and rapid traverse speeds by merely throwing a switch.

From the foregoing, it will be apparent that further important but more specific objects of the present invention include novel power drive units which:

(1) Are of unitized construction and can be easily attached to existing machines;

(2) Include a novel electronic motor control system which is simple and reliable but which provides versatility of operation;

(3) In conjunction with the preceding object, include control systems which provide adjustable drive speeds, rapid traverse speeds which are faster than normal operating speeds, and ready reversal of the direction of motor operation;

(4) In conjunction with the preceding object, have a control system providing rapid traverse which can be activated even though the switch energizing the normal speed regulating circuitry is turned off;

(5) Including a novel transmission which permits selective engagement of the motor and the feed to which it is connected and eliminates the necessity of providing limit switches and the like to prevent the power drive motor from stalling and overheating;

(6) In conjunction with the preceding object, have transmissions which are extremely rugged and durable; and (7) In conjunction with object No. 5, have transmissions in which the magnitude of torque required to produce clutch slippage can be varied, thereby further increasing the versatility of the power drive unit.

Other objects, additional advantages, and further important features of the present invention will become more fully apparent from the appended claims and as the ensuing detailed description and discussion proceeds in conjunction with the accompanying drawing, in which:

FIGURE 1 is a perspective view of a power drive unit constructed in accord with the principles of the present invention and a portion of a milling machine to which the unit is attached to operate the table feed of the milling machine;

FIGURE 2 is a side view of the power drive unit with portions of its housing broken away to show the location of its major assemblies and components;

FIGURE 3 is a section through a transmission or drive train employed in the unit to drive connect the motor of the unit to the lead screw or other input element of the mechanism operated by the drive unit; and FIGURE 4 is a circuit diagram of a novel electronic motor control system employed in the power drive unit of FIGURE 1.

Referring now to the drawing, FIGURE 1 illustrates a milling machine 10 provided with a power drive unit 12 constructed in accord with the principles of the present invention to feed or traverse the table 14 of the milling machine. The major components of drive unit 12 are a universal type electric motor 16, an electronic control system 18 for the motor, and a transmission or drive train 20, which drive connects motor 16 to the lead screw 22 of the milling machine table feed (not illustrated except for the lead screw.) The foregoing components are encased in or attached to a housing 24 on which feed and jog switches S26 and S28, a motor speed regulating knob 30, and a clutch operating lever 32 are mounted.

The details of the milling machine and its table feed are not part of the present invention; and it is therefore not considered necessary to illustrate or describe the milling machine or table feed in detail herein. Briefly speaking, however, the workpiece to be machined is fixed to table 14 and the table is fed or traversed to the left (or right) as oriented in FIGURE 1 to move the work against a rotating tool. This is done by rotating the lead screw 22 mentioned previously, which is axially fixed relative to the table 14 of the machine and passes through a fitting fixed to the frame of the machine and provided with complementary internal threads. Consequently, as the lead screw is rotated, the table moves along it to the left or right as viewed in FIGURE 1, depending upon the direction of rotation of the lead screw.

In the smaller milling machines, which are the type to which the present invention particularly relates, the lead screw is rotated manually. As discussed previously, however, it is the purpose of the present invention to provide an attachment or accessory which may be added to such a milling machine to provide a power-operated lead screw.

To attach drive unit 12 to milling machine 10, a tray (not shown) at the right-hand side of the machine and a crank (likewise not shown) attached to the outboard end of lead screw 22 are removed; and the drive unit is bolted to the table 14 of the milling machine by bolts 36 which extend through transmission housing 38 (which comprises the upper portion of drive unit housing 24).

With drive unit 12 bolted to milling machine table 14, lead screw 22 extends through an aperture 42 in transmission housing 38 into the interior of the transmission housing. The lead screw is rotatably supported in transmission housing 38 by a bearing 46 and extends seriatim through the inner race of the bearing and a bearing spacer 48. Bearing 46, as shown in FIGURE 3, is seated in an annular recess 50 in a bearing holder 52. The bearing holder is fitted in the aperture 42 through the side of transmission housing 38 and is retained in place by screws 54, which extend through bearing holder flange 56 into drilled and tapped apertures 58 in the transmission housing.

Bearing spacer 48 is a cylindrical tube which abuts bearing 46 and extends in surrounding relationship to lead screw 22 through an aperture 60 in the bearing holder in communication with recess 50.

As mentioned previously, lead screw 22 is fixed relative to the table of milling machine 10. To prevent axial movement between the lead screw and transmission 20, a nut 62 is threaded on the end of the lead screw. Nut 62 engages an annular internal shoulder 64 in a cylindrical drive shaft 66, which is fixed against movement to the left relative to the transmission housing 38 by bearing spacer 48. This prevents lead screw 22 from moving to the left (as viewed in FIGURE 3) relative to the transmission. Movement to the right is prevented by the engagement of an annular shoulder 67 on lead screw 22 with the inner race of bearing 46.

With drive unit 12 thus assembled to milling machine table 14, lead screw 22 can be driven by drive unit motor 16 which, as best shown in FIGURE 2, is fixed as by cap screws 68 to the rear wall 70 of transmission housing 38.

The output shaft 72 of motor 16 projects through an opening 74 in wall 70 into the interior of the transmission housing where it is fixed, as by set screws 76, to one end of a worm shaft 78. Worm shaft 78 is rotatably supported in the transmission housing by motor output shaft 72 and by roller bearing 80, which surrounds the worm shaft and is fitted in a recess 82 in the front wall 84 of transmission housing 38.

Referring now to both FIGURES 2 and 3, worm shaft 78 carries a worm 86 which engages teeth 88 formed on the periphery of a clutch input element 90. The input element is mounted for rotation and for axial movement in the bore 92 of a bearing boss 94 formed at one end of transmission housing 38. Clutch input element 90 surrounds the drive shaft 66 mentioned previously, which is rotatably supported in a bore 96 through clutch element 90 and by lead screw 22 which it surrounds. The clutch element is fixed to lead screw 22 by a half-moon key 98. Also surrounding drive shaft 66 is a second or output clutch element 100 which is fixed to the drive shaft by a half-moon key 102.

As shown in FIGURE 3, clutch elements 90 and 100 have complementary internal and external conical clutch faces 104 and 106 which, when engaged, establish a drive train from motor output shaft 72 through worm shaft 78, worm 86, clutch input element 90, clutch output element 100, key 102, drive shaft 66, and key 98 to lead screw 22.

Clutch elements 90 and 100 are normally urged apart to maintain clutch surfaces 104 and 106 out of engagement by a compression spring 108 disposed in complementary annular recesses 110 and 112 in clutch members 90 and 100, respectively. At one end, spring 108 bears against the end of the recess 110 in clutch member 90. The other end of spring 108 abuts the race 114 of a bearing 116 fitted in a recess 118 in clutch member 100. Bearing 116 permits spring 108 to rotate with clutch member 90 relative to clutch member 100 when the clutch members are not engaged.

Clutch member 100 is prevented from moving to the left by a snap ring 120 fitted in shaft 66 at the left-hand end of the output member. Clutch member 90 is moved into engagement with stationary clutch member 100 by rotating the clutch operating lever 32 (see FIGURE 2) in a clockwise direction. Operating lever 32 is threaded into one end of a shaft 122 which is rotatably supported in the bore 124 of a shaft supporting boss 126 at the right-hand end of transmission 20.

Formed on shaft 122, integrally or as a separate member, is a cam 128 having a cam surface 130. As lever 32 and shaft 122 rotate, cam 128 moves a thrust assembly 132 to the left, forcing clutch input member 90 to the left until its clutch surface 104 frictionally engages the clutch surface 106 of cam output member 100.

As shown in FIGURE 3, thrust assembly 132 includes a bearing 134 disposed in the bore 92 in bearing boss 94. One race 136 of the bearing engages the right-hand end of clutch input member 90. Engaging the other race 138 of bearing 134 is a bearing plug 140, which fits into bearing 134. Threaded into bearing plug 140 is an adjusting screw 142, the head of which engages the cam surface 130 of cam 128. By threading the adjusting screw into and out of bearing plug 140, the force exerted by cam 128 through the thrust assembly to move clutch input member 90 against clutch output member 100 can be varied. This provides a means of varying the frictional force between clutch surfaces 104 and 106 when they are engaged and, therefore, the torque which the clutch will transmit without slippage.

Rotation of clutch operating lever 32 between the clutch engaged and disengaged positions is limited by a stop 144, threaded into transmission housing boss 126, which engages opposite edge portions of a flat 146 milled or otherwise formed on shaft 122.

The selectively engageable clutch arrangement just described is an important feature of the present invention since, by engaging and disengaging the clutch, the milling machine table 14 can be moved through any desired traverse and can be positioned at any particular point desired. In addition, this arrangement is an important safety feature since, when table 14 reaches either of its limits of movement, clutch member 90 will slip relative to clutch member 100. This prevents motor 16 from being stalled and overheated when the table reaches a limit position without the necessity of employing the limit switches and associated circuitry heretofore utilized for this purpose.

In addition to the novel, improved transmission just described, the present invention also includes a novel control system 18 for motor 16 (mentioned previously) which permits the motor to be operated at varying speeds to vary the rate of traverse of milling machine table 14 and which permits the direction of rotation of the motor output shaft 72 to be reversed so that the table may be traversed to either the left or the right as viewed in FIGURE 1. In addition, this system includes a novel jog switch arrangement which permits the normal speed regulating circuitry to be bypassed, permitting the table to be rapidly traversed from one point to another, when desired. The jog switch circuitry also includes circuitry for reversing the direction of motor rotation so that rapid traverse may be made in either direction.

The motor control system thus briefly described is shown in FIGURE 4. Referring now to this figure, motor 16, which will normally be of fractional horsepower and of the reversible universal type, is connected to an appropriate source of A.C. voltage 148 by leads L150 and L152. Lead L150 is connected from source 148 through a fuse 154 to the field winding 156 of the motor. The field winding is connected through lead L158 to the anode of a silcon controlled rectifier V160 (hereinafter SCR). The cathode of the SCR is connected by lead L162 to the armature winding 164 of motor 16. The latter is connected by lead L152 to the opposite side of power source 148.

From the foregoing it will be apparent that, when SCR 160 is fired, the field and armature windings 156 and 164 of motor 16 will be connected in series across the source of operating voltage 148. The operation of SCR 160 is controlled by circuits including a charging circuit which includes a fixed resistor R166 connected through a branch lead L168 to main lead L150 and through a branch lead L170 to one end of a potentiometer R172. The opposite end of the potentiometer is connected through branch lead L174 and main lead L152 to the opposite side of the voltage source. The slider 176 of potentiometer R172 is connected through diode V178 and branch lead L180 to the gate terminal of SCR V160. Connected across slider 176 and lead L174 is a supply voltage capacitor C182.

The operation of the motor speed regulating circuitry just described is explained in detail in paragraph 8.8.3.2 of General Electric's SCR Manual (3rd edition) so it is not believed necessary to describe its operation in detail herein. Briefly speaking, however, capacitor C182 is charged during the positive half-cycle of the voltage supply from A.C. source 148. When the polarity of the supply voltage reverses, capacitor C182 discharges through potentiometer R172, applying a voltage through slider 176 and lead L180 to the gate of SCR V160 to fire the SCR. This completes the anode-cathode circuit of the SCR, and operating voltage is applied across the armature and field windings 156 and 164 of motor 16. When the polarity of the supply voltage again reverses, the SCR is extinguished; and the process repeats.

When motor 16 is first started up, there is no voltage opposing the gate voltage supplied by capacitor C182; and SCR V160 is therefore turned on early in the cycle. As the speed of the motor increases, a residual voltage builds up in armature winding 164. This is applied through lead L162 to the cathode-gate circuit of SCR V160. The induced voltage opposes the gate voltage; and, therefore, as the motor speed increases, the SCR is fired later in the cycle. Once the motor reaches operating speed, it is automatically maintained at this speed since, if the motor slows down, the residual voltage will decrease; and the SCR will fire earlier in the cycle to increase the motor speed. Conversely, if the load on the motor is decreased, the motor will tend to speed up and the residual voltage will increase, causing the SCR to fire later in the cycle to decrease the motor speed. A capacitor C183 and resistor R184 connected in parallel across leads L162 and L180 prevent spurious signals from firing the SCR.

The speed at which the motor is maintained may be adjusted by moving the slider 176 of potentiometer R172 along the resistance 185 of the latter. This changes the charging rate of the capacitor (which is charged through potentiometer R172) and, therefore, the maximum voltage of the charge stored in the capacitor. Consequently, if potentiometer R172 is set to provide a high resistance, the necessary gate voltage will build up in capacitor C182 later in the cycle, the SCR will be fired later in the cycle, and the motor speed will be lower than if potentiometer R172 is adjusted to provide a lower resistance to fire the SCR earlier in the cycle. In the present invention, the slider 176 of potentiometer R172 is connected to the speed regulating knob 30 (see FIGURE 2) on the front panel 186 of a casing 187 which houses the control system 18 and forms the lower part of drive unit housing 24.

In addition to the circuitry just described, motor control 18 includes the feed switch S26, mentioned previously, which is of the double throw, triple pole type. Switch S26 may be thrown so that contactors 188a–c engage either switch contacts 190a–c or contacts 192a–c. With the switch thrown to the first of these positions, current will flow in a direction through field windings 156 which is opposite to the direction of current flow when the switch is in the second of these positions. Consequently, by throwing switch S26 to one or the other of these two positions, the direction of current flow through the motor field windings and, therefore, the direction of rotation of motor 16, can be reversed. This arrangement is an important feature of the present invention since it provides an extremely simple and reliable means of reversing the direction of traverse of milling machine table 14.

Another important feature of control system 18 is the previously mentioned jog switch S28, which is also a double throw, triple pole switch, except that switch S28 is of the momentary type. In other words the switch contactors 194a–c must be held against switch contacts 196a–c or 198a–c. If the switch actuator is released, the switch will open as shown in FIGURE 4. Jog switch S28 may be employed to effect rapid traverse of milling machine table 14. It is accordingly an important feature of the present invention because it permits the milling machine table to be moved quickly from one point to another under circumstances here it is not necessary to traverse the table at the slower feed speeds employed when the workpiece is being moved against the cutting tool.

Referring now to FIGURE 4, with contactors 194a–c of jog switch S28 held against switch contacts 196a–c, a circuit is completed from voltage source 148 through main lead L150, branch lead L200, contactor 194c, switch contact 196c, and branch lead L202 to one end of the coil of a relay K204, the opposite end of which is connected by main lead L152 to the power source. Energization of relay K204 opens its normally closed contacts CK204a–d and closes its normally open contacts OK204e and OK204f.

Opening of the normally closed contacts CK204a–d interrupts the continuity of leads L150, L158, L162, and L168. The discontinuity in lead L150 interrupts the circuit from voltage source 148 to feed switch S26, and the discontinuity in lead L168 interrupts the charging circuit for the supply voltage capacitor C182.

The interruption of the continuity in leads L158 and L162 interrupts the voltage supply circuit through the SCR to the field and armature windings 156 and 164 of motor 16. However, with normally open contacts OK204e and OK204f closed, field and armature windings 156 and 164 are connected directly across voltage source 148 by a circuit including main lead L150, branch lead L206, jog switch contactor 194b, jog switch contact 196b, branch lead L208, field winding 156, branch lead L210, jog switch contact 196a, jog switch contact 194a, branch lead L212, armature winding 164, and main lead L152 (a diode V214 in lead L174 prevents the voltage across this circuit from being applied across the supply capacitor charging circuit to trigger the SCR). This circuit applies maximum voltage across the field and armature windings, operating motor 16 at its highest speed to cause rapid traverse of milling machine table 14.

When the actuator of jog switch S28 is released, the switch automatically opens as described previously; and relay K204 de-energizes, restoring control of the motor speed to SCR V160 through the circuitry described previously.

When jog switch S28 is thrown so that contactors 194a–c engage contacts 198a–c rather than contacts 196a–c, field and armature windings 156 and 164 are connected directly across voltage source 148 in the manner just described except that the current flows in the opposite direction through the field windings. Motor 16 therefore rotates in the opposite direction to traverse table 14 in the opposite direction.

From the foregoing, it will be apparent that the jog switch circuitry just described is an important feature of the present invention since it not only provides for rapid traverse of table 14 in both directions but, in addition, provides the rapid traverse function without disturbing the normal operating speed to which motor 16 is adjusted by manipulation of speed control knob 30.

From the foregoing description of an exemplary application of the principles of the present invention, it will be apparent to those skilled in the arts to which the present invention relates that the principles of this invention are by no means limited to this one particular application of them. Therefore, as mentioned previously, the foregoing description of one particular application of these principles is intended to be merely illustrative and not limiting. Also, it will be apparent to those having the appropriate skills that the illustrated embodiment of the present invention is not limited to use with one particular type of milling machine but that it can be adapted to any milling machine having a manual table feed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A variable speed power drive unit for power tools and like devices having power input means, comprising an electric motor; and electronic speed control system which includes means for selectively varying the speed of said motor and means for so varying the supply of power to said motor as the load on said motor changes as to maintain the motor speed at the selected level; said last-named means including input means electrically connected to said motor for an input signal generated by the motor and indicative of its speed and means for drive connecting the motor of the drive unit to the input means of the device with which said unit is associated, said drive connecting means having a selectively engageable clutch incorporated therein.

2. A variable speed power drive unit for power tools and like devices having a rotatable input shaft, comprising an electric motor; an electronic switch in series with said motor for connecting said motor across a source of operating voltage; circuit means for turning said switch on and off with a frequency and for periods of a duration determined by the variation of the speed of the motor from a predetermined operating speed; selectively operable switch means for completing a circuit around said electronic switch and connecting said motor directly across said source of operating voltage to increase the energy supplied to said motor and thereby increase the speed of said motor above said predetermined operating speed; and means selectively engageable to drive connect the motor of the drive unit to the input shaft of the device with which said unit is associated.

3. The variable speed power drive unit of claim 2, wherein said electronic switch has first and second terminals connected in series with said motor windings and a third terminal, the application of a control voltage of predetermined magnitude to which will turn on said switch and complete a conductive path between said first and second terminals and the circuit means for turning said switch on an off includes a capacitor connected to the control terminal of the electronic switch and circuits through which said capacitor is alternately charged to a voltage at least equal to the control voltage and discharged to periodically turn said switch on and off.

4. The variable speed power drive unit of claim 2, wherein the means for connecting the motor windings directly across the source of operating voltage includes an override circuit in parallel with said electronic switch for connecting the armature winding of the motor directly to the field winding of the motor; a relay having normally closed contacts in series with said motor windings and said electronic switch and normally open contacts in said override circuit, and means including a selectively operable jog switch for energizing said relay to open its normally closed contacts, thereby interrupting the connections between the electronic switch and the motor windings and closing its normally open contacts to complete said override circuit, whereby the motor windings are connected directly across the source of operating voltage to increase the speed of said motor above the operating speed maintained by the turning on an off of said electronic switch.

5. The variable speed power drive unit of claim 4, together with means including a selectively operable switch independent of said jog switch for reversing the direction of rotation of said motor.

6. The variable speed power drive unit of claim 4, together with means comprising said jog switch for reversing the direction of rotation of said motor.

7. The variable speed power drive unit of claim 3, together with a potentiometer in the capacitor charging circuit for varying the speed of said motor by varying the charging rate of said capacitor.

8. The variable speed power drive unit of claim 3, wherein there is a junction between the capacitor charging circuit and the circuit around the electronic switch and a diode in the charging circuit to prevent said capacitor from being charged through the circuit around the electronic switch when the jog switch is closed.

9. A selectively engageable, variable speed power drive unit for power tools and the like having a rotatable input shaft, comprising a control system including electronic speed regulating means for maintaining said motor at a fixed operating speed; and means for drive connecting said motor to said input shaft having a selectively engageable clutch incorporated therein, said last-mentioned means comprising a hollow drive shaft adapted to surround said input shaft; means for fixing said input shaft to said drive shaft for rotation therewith; a clutch assembly having a first clutch element fixed to said drive shaft, a second clutch element journalled on said drive shaft and axially and rotatably movable relative thereto, and means biasing said clutch elements out of operative engagement; means for drive connecting the second of said clutch elements to said motor; and selectively operable control means for engaging said second clutch element and moving it into driving engagement with the first clutch element against the force exerted by said biasing means.

10. The variable speed power drive unit of claim 9, together with a bearing concentric with and spaced from one end of said drive shaft for rotatably supporting said input shaft.

11. The variable speed power drive unit of claim 9, wherein said control means comprises a thrust assembly positioned adjacent one end of said second clutch element; a control shaft having a cam thereon rotatably mounted with said cam surface adjacent said second clutch element; and a member for rotating said control shaft to thereby cause said cam to move said thrust assembly in a direction effecting clutch engaging movement of said second clutch element.

12. The variable speed power drive unit of claim 11, wherein said thrust assembly includes a thrust bearing and a member between said thrust bearing and said control shaft cam and adjustable toward and away from said bearing for varying the force exerted on the clutch element biasing means by the clutch control means, whereby the torque required to cause slippage between the clutch elements may be selectively varied.

13. The variable speed power drive unit of claim 11, together with a housing and means including a stop fixed to said housing for limiting rotation of said control shaft between first and second positions in which the second clutch element is respectively engaged with and disengaged from the first clutch element.

References Cited

UNITED STATES PATENTS

| | | | |
|---|---|---|---|
| 2,695,086 | 11/1954 | Parker | 192—.02 |
| 2,403,094 | 7/1946 | Lear | 192—.02 |
| 2,903,106 | 9/1959 | Mason et al. | 192—.02 |
| 2,939,333 | 6/1960 | Thomas | 192—.02 X |
| 3,143,695 | 8/1964 | Hohne et al. | 318—257 |
| 3,187,247 | 6/1965 | Colten et al. | 318—257 |
| 3,302,089 | 1/1967 | Rosa et al. | 318—257 |

BENJAMIN W. WYCHE III, *Primary Examiner.*